United States Patent
Quiet et al.

(10) Patent No.: US 10,222,824 B2
(45) Date of Patent: Mar. 5, 2019

(54) DUAL DISPLAY SYSTEM

(71) Applicant: Intel Corporation, Santa Clara, CA (US)

(72) Inventors: Duane Quiet, Hillsboro, OR (US); Terry Lauer, Cornelius, OR (US); Richmond F. Hicks, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 508 days.

(21) Appl. No.: 14/498,589

(22) Filed: Sep. 26, 2014

(65) Prior Publication Data

US 2015/0324002 A1 Nov. 12, 2015

Related U.S. Application Data

(60) Provisional application No. 61/992,064, filed on May 12, 2014.

(51) Int. Cl.
  G06F 1/16 (2006.01)
  G06F 3/14 (2006.01)
  (Continued)

(52) U.S. Cl.
  CPC .............. *G06F 1/16* (2013.01); *A63F 13/213* (2014.09); *A63F 13/24* (2014.09); *A63F 13/31* (2014.09); *G06F 1/162* (2013.01); *G06F 1/1616* (2013.01); *G06F 1/1618* (2013.01); *G06F 1/1641* (2013.01); *G06F 1/1686* (2013.01); *G06F 3/005* (2013.01); *G06F 3/01* (2013.01);
  (Continued)

(58) Field of Classification Search
  CPC ....... G06F 2203/04803; G06F 3/04883; G06F 3/04886; G06F 1/1601; G06F 1/1616; G06F 1/1618; G06F 1/162; G06F 1/1649; H04L 12/1822
  See application file for complete search history.

(56) References Cited

U.S. PATENT DOCUMENTS 5,438,357 A * 8/1995 McNelley ............... H04M 3/56
                                                348/14.01
6,094,341 A * 7/2000 Lin ....................... G06F 1/1616
                                                345/905
(Continued)

FOREIGN PATENT DOCUMENTS

CN        102981562 A      3/2013
CN        103731602 A      4/2014
(Continued)

OTHER PUBLICATIONS

International Preliminary Report for International (PCT) Patent Application No. PCT/US2015/024958, dated Jun. 23, 2015, 3 pages.

(Continued)

*Primary Examiner* — Steven J Hylinski
(74) *Attorney, Agent, or Firm* — International IP Law Group, P.L.L.C.

(57) ABSTRACT

The subject innovation relates to an apparatus that includes an integrated case with all parts disposed within. The apparatus includes a processor, at least two displays, at least two cameras, and a storage system. The storage system comprises code to direct the processor to obtain input from the at least two cameras, and provide display information to the at least two displays.

55 Claims, 17 Drawing Sheets

(51) Int. Cl.

| | | |
|---|---|---|
| *G06F 3/01* | (2006.01) | |
| *H04N 7/14* | (2006.01) | |
| *H04N 5/232* | (2006.01) | |
| *A63F 13/213* | (2014.01) | |
| *A63F 13/24* | (2014.01) | |
| *A63F 13/31* | (2014.01) | |
| *G06F 21/00* | (2013.01) | |
| *G06F 3/00* | (2006.01) | |
| *G06F 3/03* | (2006.01) | |
| *A63F 13/214* | (2014.01) | |

(52) U.S. Cl.
CPC .............. *G06F 3/011* (2013.01); *G06F 3/017* (2013.01); *G06F 3/0304* (2013.01); *G06F 3/14* (2013.01); *G06F 3/1423* (2013.01); *G06F 3/1431* (2013.01); *G06F 21/00* (2013.01); *H04N 5/23238* (2013.01); *H04N 7/142* (2013.01); *A63F 13/214* (2014.09); *G09G 2354/00* (2013.01)

(56) References Cited

U.S. PATENT DOCUMENTS

| | | | | |
|---|---|---|---|---|
| 6,295,038 | B1 * | 9/2001 | Rebeske | G06F 1/1616 345/1.1 |
| 6,816,625 | B2 * | 11/2004 | Lewis, Jr. | H04N 5/217 348/E5.078 |
| 7,136,282 | B1 | 11/2006 | Rebeske | |
| 7,916,181 | B2 * | 3/2011 | Nilehn | G06T 5/50 348/222.1 |
| 8,289,688 | B2 * | 10/2012 | Behar | G06F 1/162 361/679.27 |
| 8,400,564 | B2 * | 3/2013 | Jacobs | G06F 1/1616 345/1.3 |
| 9,013,867 | B2 * | 4/2015 | Becze | G06F 3/1438 361/679.27 |
| 9,177,368 | B2 * | 11/2015 | Cabral | G06T 5/006 |
| 9,332,167 | B1 * | 5/2016 | Pance | H04N 5/2258 |
| 2003/0160862 | A1 * | 8/2003 | Charlier | H04N 5/23238 348/14.08 |
| 2005/0110964 | A1 * | 5/2005 | Bell | G06F 3/011 353/122 |
| 2008/0024388 | A1 | 1/2008 | Bruce | |
| 2008/0174678 | A1 * | 7/2008 | Solomon | G02B 27/0025 348/231.99 |
| 2008/0239107 | A1 * | 10/2008 | Cho | H04N 5/217 348/241 |
| 2009/0296331 | A1 * | 12/2009 | Choy | G06F 1/1616 361/679.09 |
| 2010/0079355 | A1 * | 4/2010 | Kilpatrick, II | G06F 1/1616 345/1.3 |
| 2010/0085382 | A1 * | 4/2010 | Lundqvist | G06F 1/1616 345/659 |
| 2010/0321275 | A1 | 12/2010 | Hinckley et al. | |
| 2011/0090147 | A1 * | 4/2011 | Gervais | G06F 3/017 345/157 |
| 2011/0164163 | A1 * | 7/2011 | Bilbrey | G06F 1/1694 348/333.01 |
| 2011/0242134 | A1 * | 10/2011 | Miller | G06T 19/006 345/633 |
| 2012/0002082 | A1 * | 1/2012 | Johnson | G06T 5/50 348/234 |
| 2012/0081270 | A1 * | 4/2012 | Gimpl | G06F 1/1616 345/1.3 |
| 2012/0081400 | A1 * | 4/2012 | Schrock | G06F 1/1616 345/649 |
| 2012/0105363 | A1 * | 5/2012 | Sirpal | G06F 1/1616 345/174 |
| 2012/0147535 | A1 * | 6/2012 | Ahn | G06F 1/1641 361/679.01 |
| 2012/0266098 | A1 * | 10/2012 | Webber | G06Q 10/107 715/778 |
| 2013/0021262 | A1 * | 1/2013 | Chen | G06F 3/0488 345/173 |
| 2013/0021265 | A1 | 1/2013 | Selim | |
| 2013/0076591 | A1 * | 3/2013 | Sirpal | G06F 3/1438 345/1.3 |
| 2013/0080938 | A1 * | 3/2013 | Reeves | G06F 3/1438 715/761 |
| 2013/0321339 | A1 | 12/2013 | Irie | |
| 2014/0056513 | A1 * | 2/2014 | Grossmann | H04N 9/045 382/162 |
| 2014/0098188 | A1 | 4/2014 | Kwak et al. | |
| 2014/0101578 | A1 | 4/2014 | Kwak et al. | |
| 2014/0118257 | A1 * | 5/2014 | Baldwin | G06F 3/017 345/158 |
| 2014/0191998 | A1 * | 7/2014 | Chuang | G06F 3/017 345/173 |
| 2014/0375530 | A1 * | 12/2014 | Delaporte | G06F 1/1616 345/1.3 |
| 2015/0116364 | A1 * | 4/2015 | Aurongzeb | G06F 3/0487 345/659 |
| 2015/0121287 | A1 * | 4/2015 | Fermon | G06F 3/016 715/773 |
| 2015/0172539 | A1 * | 6/2015 | Neglur | H04N 5/23206 348/207.1 |
| 2015/0241978 | A1 * | 8/2015 | Lombardi | G06F 3/017 345/156 |
| 2017/0052566 | A1 * | 2/2017 | Ka | G06F 1/1652 |
| 2017/0052634 | A1 * | 2/2017 | Reeves | G06F 3/017 |

FOREIGN PATENT DOCUMENTS

| | | |
|---|---|---|
| JP | 2005215453 A | 8/2005 |
| JP | 2010045539 A | 2/2010 |
| JP | 2012175456 A | 9/2012 |
| JP | 2013047924 A | 3/2013 |
| JP | 2014078234 A | 5/2014 |
| JP | 2006140596 A | 6/2016 |

OTHER PUBLICATIONS

Supplementary European Search Report, EP Application No. EP 15792629, date of completion Nov. 17, 2017, 2 pages.

* cited by examiner

200

400

500

900

1200

1400

DUAL DISPLAY SYSTEM

CROSS REFERENCE TO RELATED APPLICATIONS

The present application claims priority to U.S. Provisional Patent Application No. 61/992,064, entitled "Dual Display System," filed on May 12, 2014, which is included by reference herein.

TECHNICAL FIELD

The present techniques generally relate to a dual display device. More specifically, the present techniques relate to a dual display device with gaming, teleconferencing, and panoramic video abilities.

BACKGROUND ART

Using two back to back devices with a local or network connection limit can interfere with a user experience during gaming, teleconferencing, and panoramic video capture. Often, user facing cameras are not optimized at the right angle to capture hand gestures on the table during gaming, and hand gestures behind one laptop can be seen easily by the other user. Further, network or local connections may not exist.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
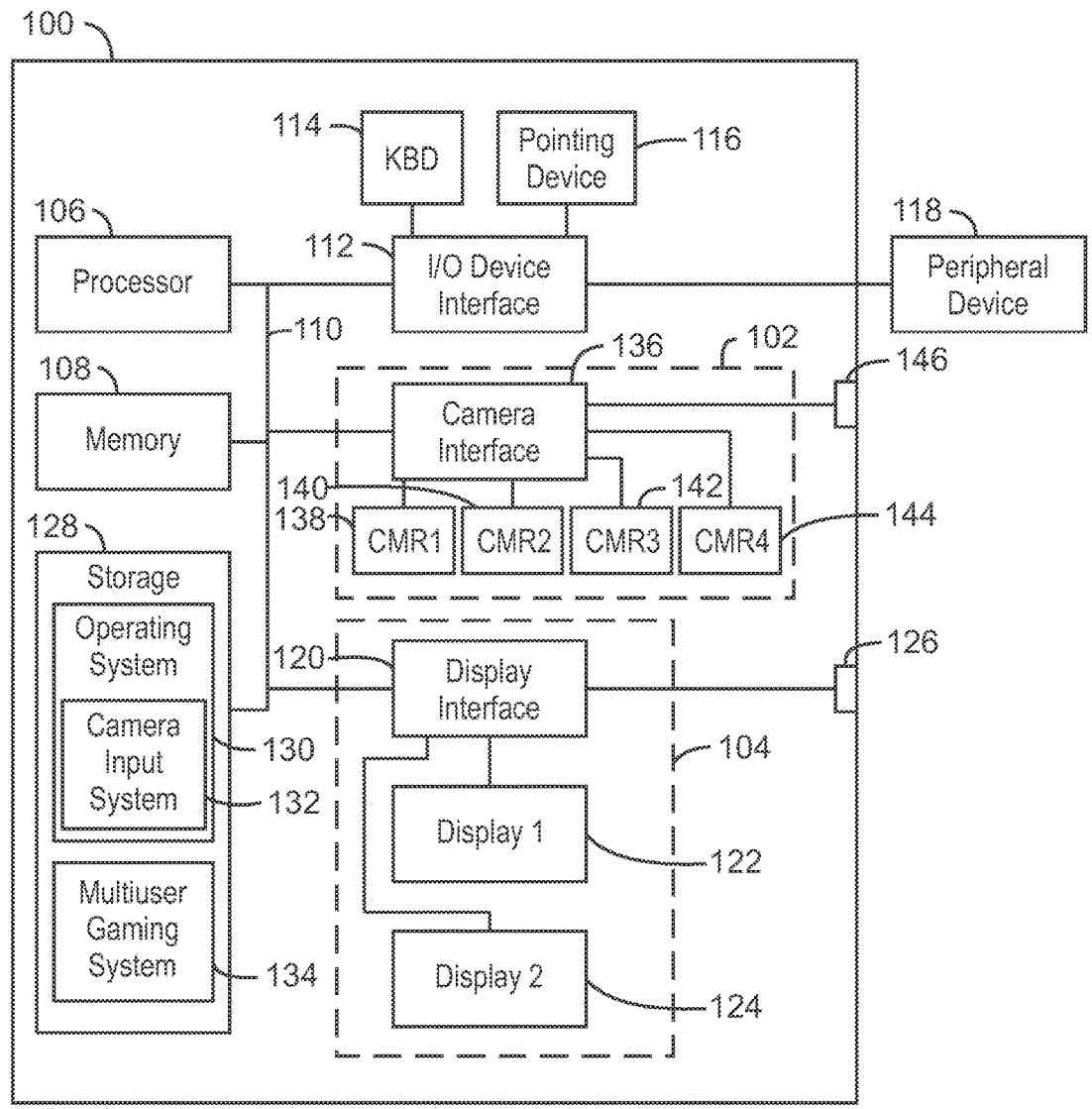
FIG. 1 is a block diagram of a computing system that may be used for dual display and camera input.

As noted above, using two back to back devices with a local or network connection limit can interfere with a user experience during gaming, teleconferencing, and panoramic video capture. Further, as PC and tablet form factors evolve with improved hinges, displays, touch, cameras, and the like, manufacturers are trying to enable new usages and experiences by virtue of the new form factors, and thus triggering users to purchase new systems in order to get these experiences.

In embodiments described herein, a form factor for a computing system may use display, touch, hinge and camera technology to enable an across the table gaming experience. In some cases, the computing system includes at least two displays, separated by a hinge enabling the system to be set up in an "A" frame position with the displays facing outward. In these systems, 2D or 3D cameras are placed adjacent to each display allowing the system to image users looking at either display. In other applications, a mechanism may be used to hold the displays open in an "upside down tent mode". This shields the information on a user's display from the other user, and creates a private area for hand gestures, based on the hinge angle. Further, techniques for symmetrical, ergonomic dual hand gestures are described herein.

The system may be used for a variety of multi-player gaming and collaboration applications. Current systems generally have a single display and interface device targeted to a single user. To enable the same experience would require two systems communicating either by cables or wirelessly. Having both displays and cameras in the same system allows better coordination of the gaming or collaboration experience as well as enabling the experience on a single system.

The system may include a gaming application that allows two users, one on each side of the system, to interact with each other either competitively or cooperatively. The cameras monitor the gestures and bodies of the players and each player has a screen he can use to monitor information about the task. In one example, two users can share a single computing device, but each user can have their own display as well as a private/shielded input area for input gestures is described herein. Each user can only see his or her display and own hand movements. Each user can make hand gestures and interact independently with their own display without the knowledge of the other user. No local or network connection is required using this gaming mode.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 is a block diagram of a computing system 100 that may be used for dual display and camera input. The computing system 100 may be an integrated system with a camera system 102 and a dual display system 104 in a single case. The computing system may be an all-in-one computer, or a laptop, among others. The system is not limited to this implementation, as external displays and cameras may be used with less portable devices. For example, the computing system 100 may be a laptop computer, a desktop computer, a tablet computer, a mobile device, a server, or a cellular phone, among others.

The dual display system 104 enables the computing system 100 to provide different displayed information for each user. As discussed herein, the information on a first user's display may not be seen by a second user and vice-versa. Further the camera system 102 allows each user to provide independent input to the computing system 100 in a way that is not visible to the other user. In addition to providing a gaming platform, the camera system 102 can be used to provide a number of other functions. For example, the camera system can provide a dual camera for videoconferencing, in which one camera is pointed at a first user and a second camera is pointed at another user. Further, the camera system 102 may also allow a user to provide independent input to the computer system from each hand, allowing more complex manipulations of data than possible with current pointing devices.

The computing system 100 may include a processor 106 that is adapted to execute stored instructions, as well as a memory device 108 that stores instructions that are executable by the processor 106. The processor 106 can be a single core processor, a multi-core processor, a computing cluster, or any number of other configurations. The processor 106 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 106 includes dual-core processor(s), dual-core mobile processor(s), or the like.

The memory device 108 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions stored in the memory device 108 and that are executed by the processor 106 may be used to provide display information to separate displays, obtain input from different users, and the like.

The processor 106 may be connected through a system bus 110 (e.g., PCI, ISA, PCI-Express, HyperTransport®, NuBus, etc.) to an input/output (I/O) device interface 112 adapted to obtain input from a keyboard 114, or a pointing device 116. The pointing device may include a touchpad or a touchscreen, for example, used in concert with a display device to provide a virtual keyboard. In some cases, the I/O device interface 112 is a USB subsystem that includes ports to attach peripheral devices 118, such as external cameras, input active whiteboards, and the like, to the computing device 118. The peripheral devices 118 can share the PD controller within the USB subsystem.

The processor 106 may also be linked through the system bus 110 to the dual display system 104 coupling to a display interface 120. The display interface 120 may be adapted to drive two displays 122 and 124, which may be integrated within the computing system 100. However, the computing system 100 is not limited to integrated displays 122 and 124, and external displays, projectors, televisions, and the like, may be connected to the display interface 120, for example, through a display port 126.

The computing system 100 may also include a storage device 128. The storage device 128 may include a physical memory such as a hard drive, an optical drive, a flash drive, an array of drives, or any combinations thereof. The storage device 128 may also include remote storage drives. The storage device 128 may also include software modules adapted to implement the techniques described herein. For example, an operating system 130 may include a camera input system 132 including code adapted to obtain input from multiple users, as described herein. The camera input system 132 may also include code adapted to obtain input from different hands of a user, for example through the camera system 102. Further, the storage device 128 may include a multiuser gaming system 134 designed to provide different images to different displays 122 or 124 of the computing system 100 and obtain input from separate users from the camera system 102, using the camera input system 132 of the operating system 130. The computing system 100 is not limited to a multiuser gaming system 134. Instead of, or in addition to, the multiuser gaming system 134, the storage device 128 may have a video conferencing system, image processing software, code for determining three dimension positions from sensors, and the like.

To facilitate the functions described herein, the camera system 102 may include a camera interface 136 coupled to the processor 106 through the system bus 110. The camera interface 136 may couple to a number of cameras 138-144 that are integrated into the system. Each of these cameras 138-144 may individually be selected from optical cameras, three dimensional optical cameras, or infrared cameras using time-of-flight determinations to map the location of objects, such as hands, in the field of view. The system is not limited to having four cameras 138-144 integrated into the case. For example, fewer cameras can be integrated within the computing device 100 for implementing only some of the functions described herein. More cameras may also be integrated into the system, in addition to cameras 138-144. Further, additional cameras can be added through external connections, such as through an external camera port 146, or through the I/O device interface 112.

Figure 2:
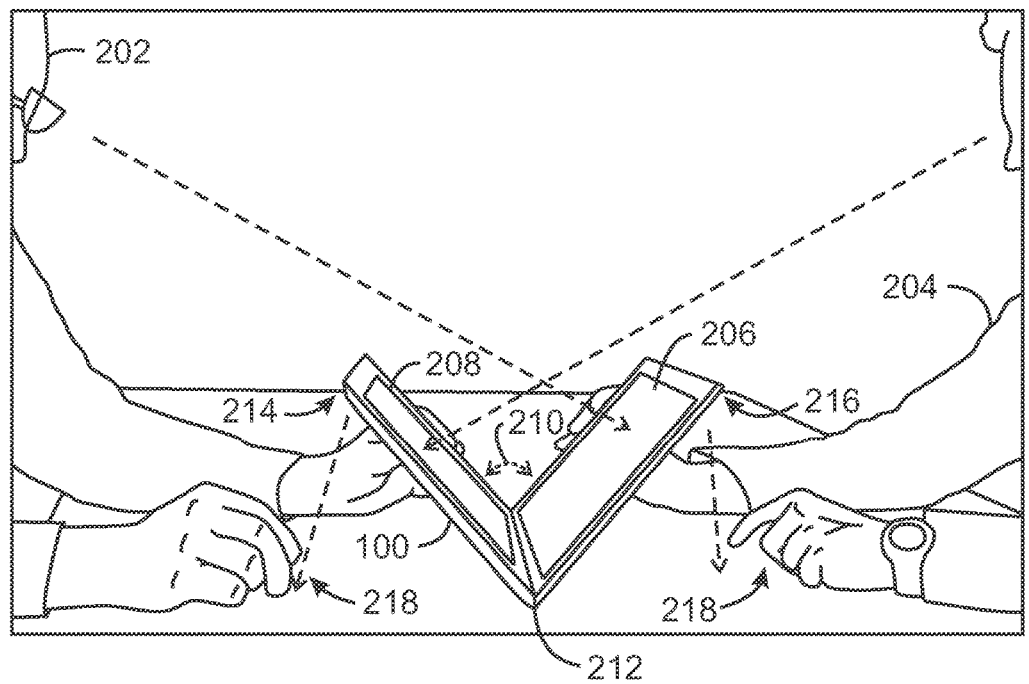
FIG. 2 is a schematic drawing of a dual display gaming and collaboration system.

FIG. 2 is a schematic drawing of a dual display gaming and collaboration system 200. Both a first user 202 and a second user 204 have their have their own display 206 and 208. Due to the angle 210 of the hinge 212, the first user 202 can only see information on the first display 206, and the second user 204 can only see information on the second display 208.

Below each the opposing displays 206 and 208 are cameras 214 and 216 pointed downwards at the users' hands 218 and capable of detecting user's gestures. The gesture cameras 214 and 216 provide "private input" areas for each user 202 and 204, where they can make hand gestures or use playing pieces for augmented reality.

As described with respect to FIG. 1, the dual display gaming and collaboration system 200 may be a single computing device 100, such as an laptop, that has two facing displays 206 and 208, two cameras 214 and 216 to capture hand gesture inputs and a mechanism to hold the displays open and in an "upside down tent mode". During use, the computing device 100 is held open and stationary on a table. The private input areas where hand gestures are performed in the shielded areas created by each of the displays 206 and 208 based on the hinge angle 210.

Figure 3:
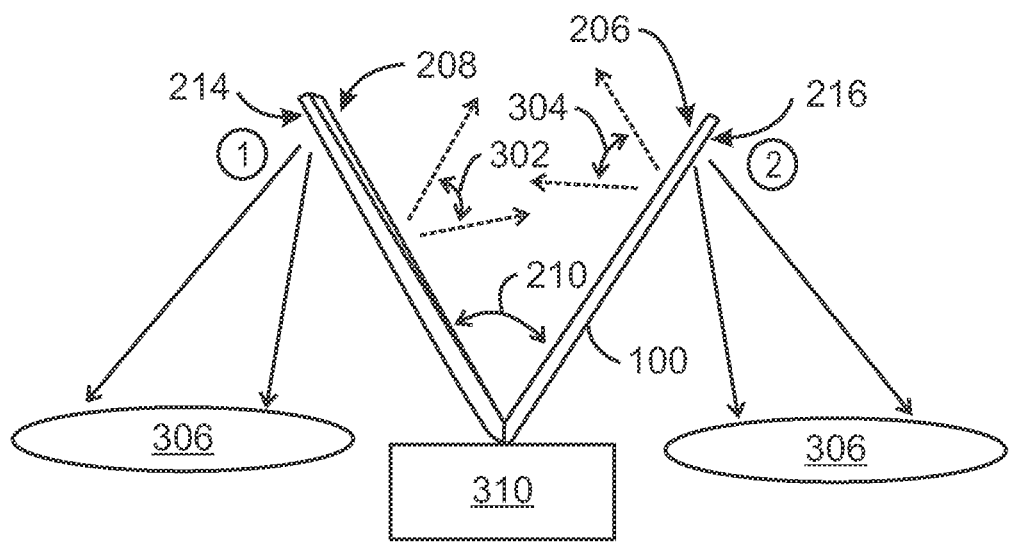
FIG. 3 is a block diagram of a dual display gaming and collaboration system.

FIG. 3 is a block diagram of the dual display gaming and collaboration system 200. Like numbered items are as described with respect to FIG. 2. Each user has an angle of viewing 302 and 304 where the user can only see his or her display 206 or 208. The combination of the camera placement angles and the opaque system parts create a private input area 306 and 308 for each user. A mechanical holder 310 can be used to position the computing device 100 and lock the computing device 100 into place. As described, the computing device 100 may include a plurality of image capture devices 214 and 216 to determine gestures within the private input areas 306 and 308 for each user.

Figure 4:
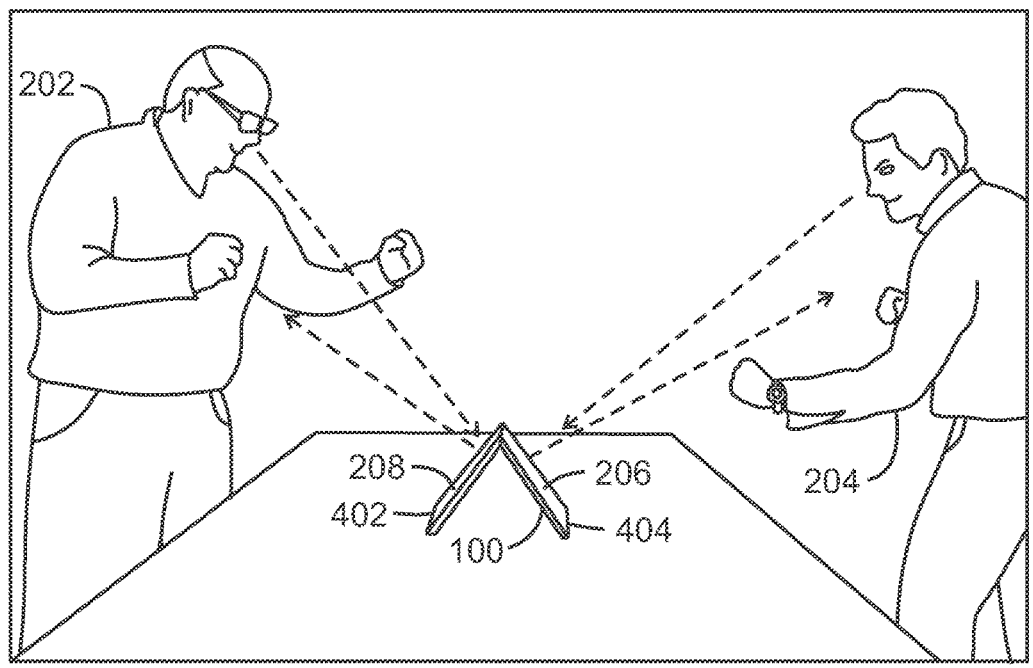
FIG. 4 is a schematic drawing of two users in a gaming experience.

FIG. 4 is a schematic drawing of two users 202 and 204 in a gaming experience 400. Like numbered items are as discussed with respect to FIGS. 2 and 3. The interactive gaming and collaboration application is run across a single computing device 100, thereby enabling seamless interaction as data is local at one system. Each user 202 and 204 has a respective individual display 208 and 206, and camera 402 and 404.

Figure 5:
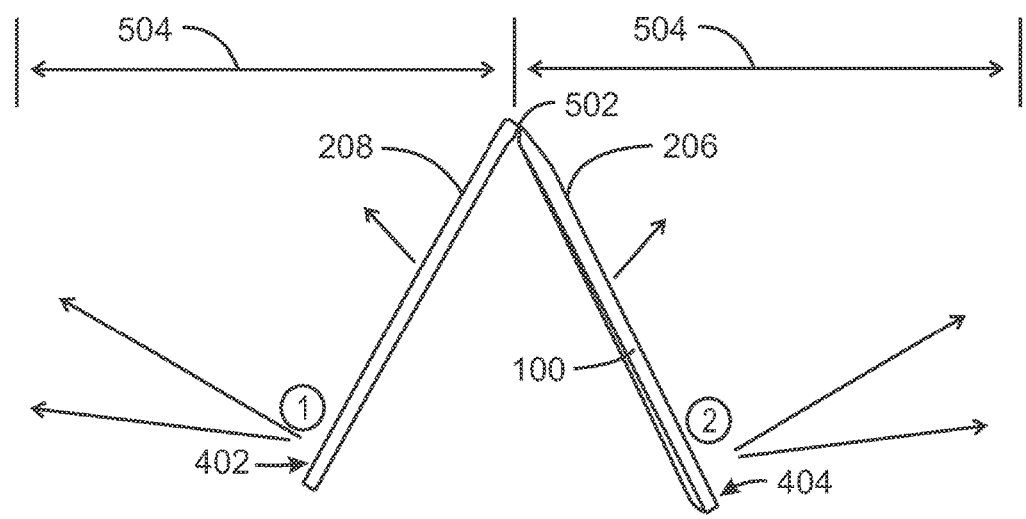
FIG. 5 is a drawing of a system 500 configured for a vertical gaming and collaboration experience.

FIG. 5 is a drawing of a system 500 configured for a vertical gaming and collaboration experience. Like numbered items are as previously discussed. In this system, the keyboard of a traditional folding computing system is replaced with a second display, e.g., display 208. When used for traditional PC applications, the secondary display 208 may be used as a keyboard, e.g., by having a touchscreen displaying the keys. Using a locking hinge 502, the system can be configured in a tented mode—which is not possible using a generic convertible with a single display. In addition, the system has at least two cameras 402 and 404, wherein a camera is co-located with each display 206 and 208. As described herein, the cameras 402 and 404 can be traditional video conferencing cameras, or may be advanced 3D cameras offering depth information in addition to the RGB data. The ability of the system 500 to differentiate smaller gestures will generally correlate with the quality of the cameras 402 and 404 used.

In face to face action gaming, two users share a single computing system 100. Each of the users may be at a distance 504 of greater than about a meter from the computing system 100. The hinge and display angles may create separate augmented reality display for each user. Each user's display may show their progress and actions with respect to their own context. In some cases, the users may make large, fast gestures, e.g., in a boxing or reflex game. To keep up with the gestures and display the information, background contrast, room lighting, fast motion gestures, and capture area (tall and short users) can be optimized by traditional 2D and new 3D cameras. Bright light and low light sensitivity can be may be addressed with high dynamic range (HDR) and ultra-low light (ULL) applications. Field of view (FOV) and optimal distance can be used to make a wider FOV possible in conjunction with geometric distortion correction.

Placement of the cameras 402 and 404 can be optimized based on priority of usages, e.g., games, video conferencing, etc., being targeted. For example, as workgroups spread across diverse locations, video conferencing continues to become more and more important. However, a common problem with video conferencing is that people that are co-located often find it convenient to use a white board to facilitate the discussion, which can cut off people outside the room.

Figure 6:
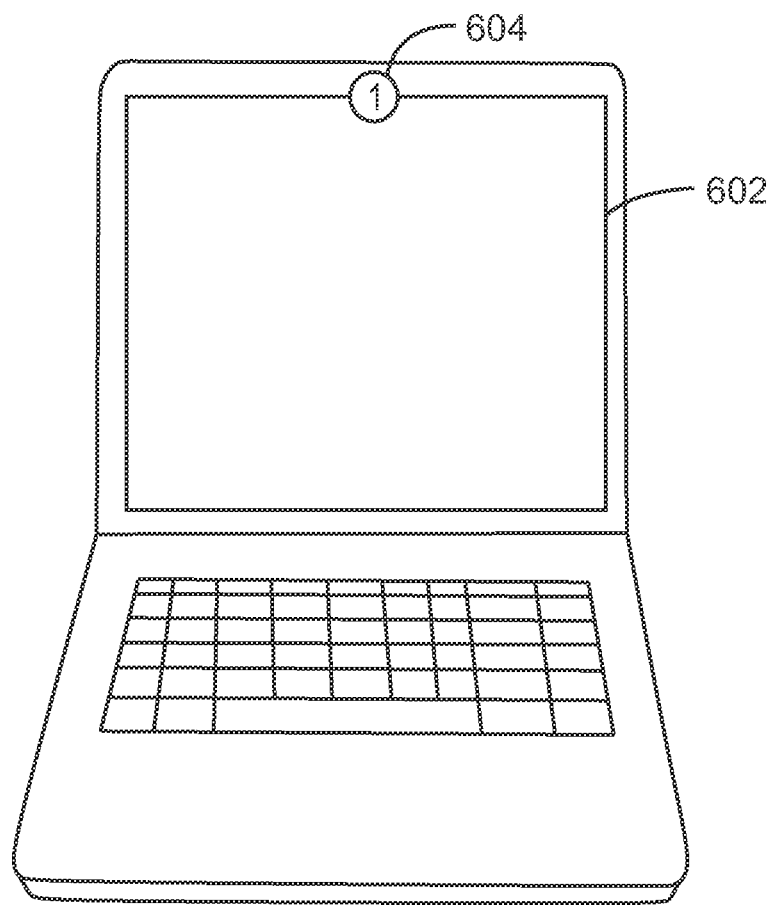
FIG. 6 is a drawing of a system that has a single display and camera device targeted to a single user.

FIG. 6 is a drawing of a system 600 that has a single display 602 and camera device 604 targeted to a single user. To enable the same experience would require two systems or at least an additional camera. In addition, video conferencing applications control the camera in order to optimize the appearance of the people. Having a special white board capture mode would allow optimization of the image capture and post processing for this usage, e.g., to ensure text and sketches are readable, remove users and moving objects from the screen, and remove other unnecessary objects from the scene.

Figure 7A:
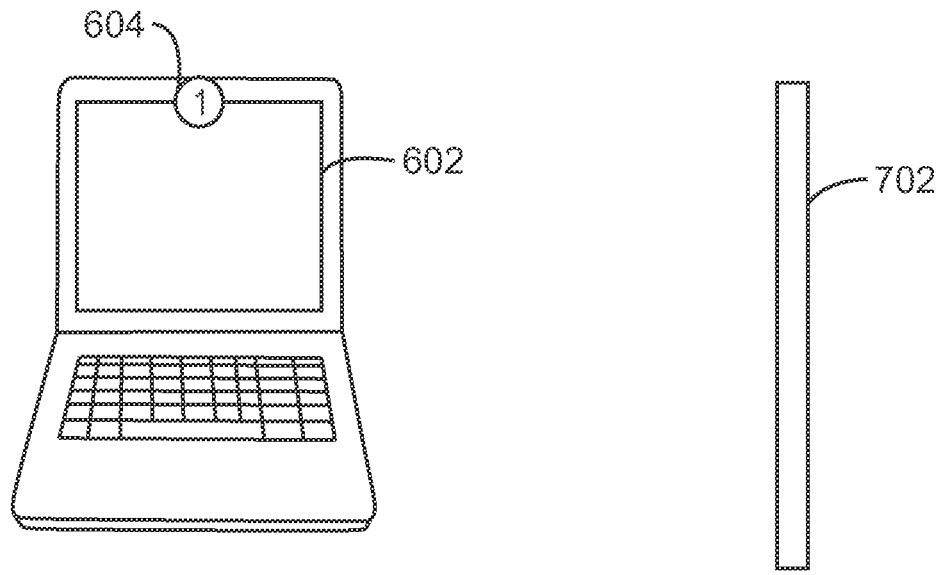
FIGS. 7A and 7B are drawings of a minimal implementation of the white board feature that could be accomplished using the hardware configuration of FIG. 6.
Figure 7B:
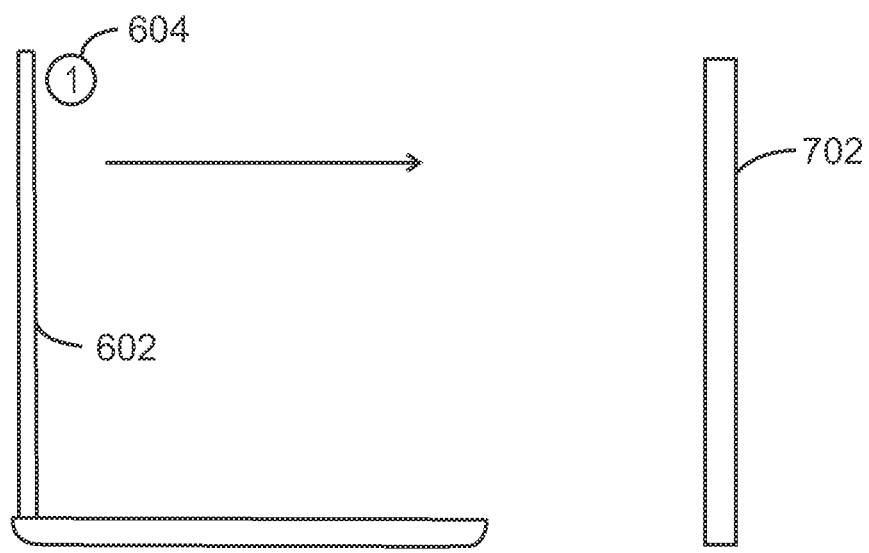

FIGS. 7A and 7B are drawings of a minimal implementation of the white board feature that could be accomplished using the hardware configuration of FIG. 6. Like numbered items are as described with respect to FIG. 6. FIG. 7A shows a system pointed at a user, while FIG. 7B shows the system swiveled to point the camera at a white board 702. In FIGS. 7A and 7B improvements are mode to the cameras exposure and post processing algorithms to allow the user to swivel the screen 604 and camera 604 to face at the white board 702 as shown in FIG. 7B. Although the capture and processing algorithms may be optimized, the camera 604 still has to be shared between the video and white board 702 usages. The primary difference between the usages from is the change in the camera hardware. A video conferencing camera has relatively low resolution and image quality when compared to the requirements for taking a photograph of a white board. This can be compensated by applying panoramic imaging, e.g., the intelligent assembly or averaging of multiple images. The experience can be further improved by using the world facing camera of a detachable system while docked as shown in FIG. 8.

Figure 8:
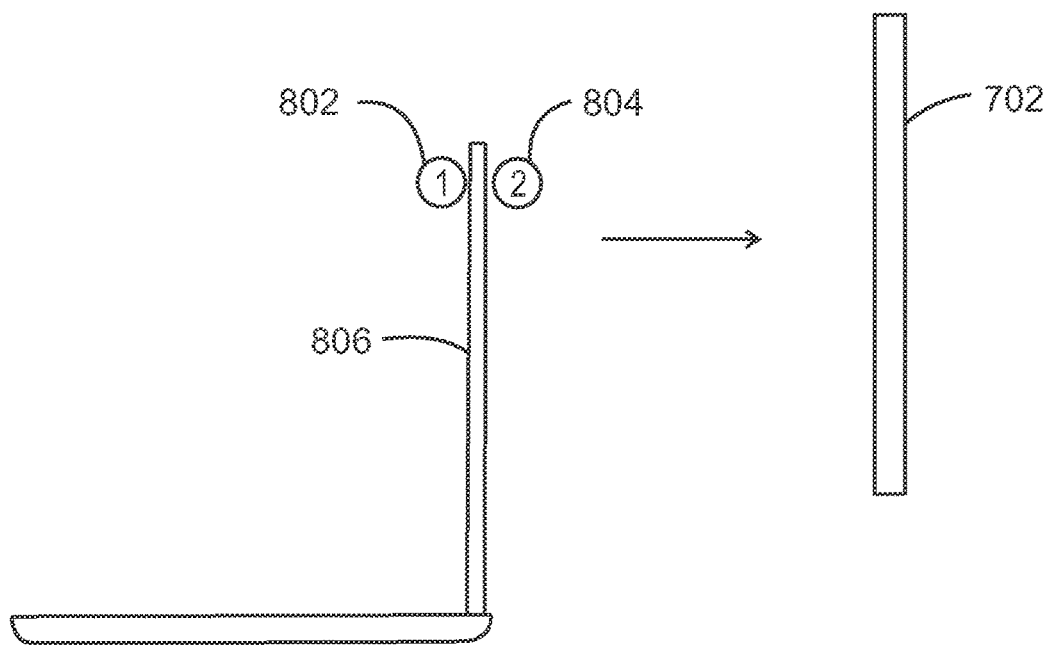
FIG. 8 is a drawing of a computing system that allows for both video conferencing through a first camera and observation of a whiteboard through a second camera.

FIG. 8 is a drawing of a computing system 800 that allows for both video conferencing through a first camera 802 and observation of a whiteboard 702 through a second camera 804. Like numbered items are as shown in FIG. 7. The second camera 804 can be designed to observe the whiteboard 702. The configuration of the computing system 800 in FIG. 8 leverages the higher performance camera 804, and allows a user in front of the computing system 800 to monitor the capture of the white board 702, for example, through a window shown on the display 806. However, the angle of view of the camera is not optimal on the whiteboard side for this usage. This can be accommodated using a wider field-of-view, but at the expense of distortion. The distortion can be corrected, but at the expense of some loss of resolution. A more favorable configuration uses a dual display system, as shown in FIG. 9.

Figure 9:
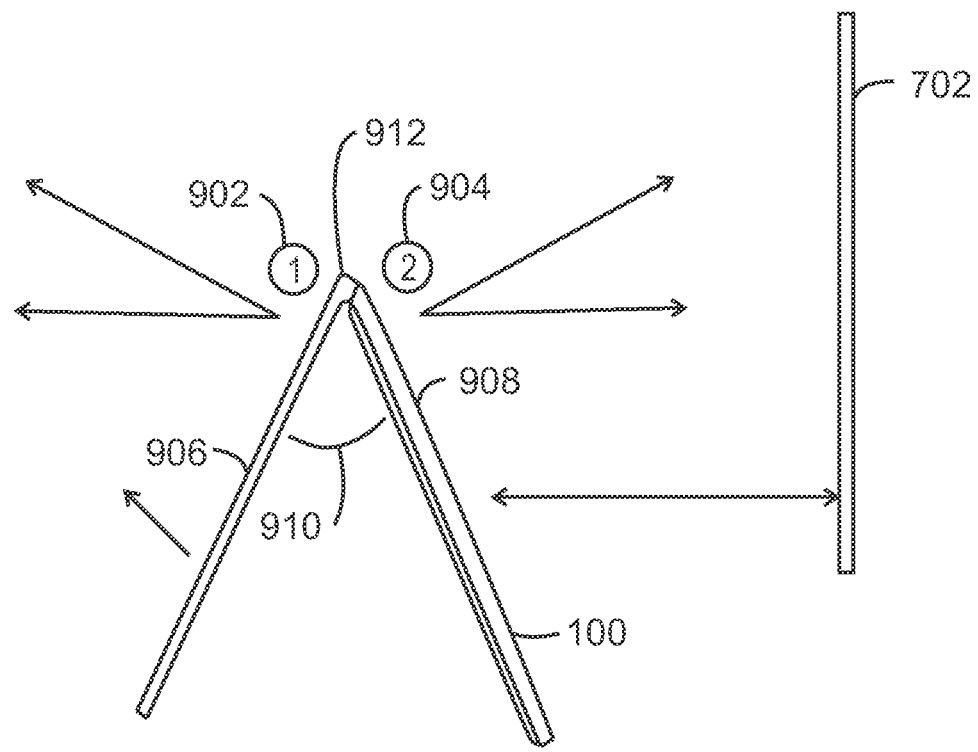
FIG. 9 is a drawing of a conferencing system.

FIG. 9 is a drawing of a conferencing system 900. Like numbered items are as described with respect to FIGS. 1 and 7. In this mode, the user can capture a picture of the white board 702 picture as needed without an interruption of the video call. The conferencing system 900 includes two cameras, a first camera 902 is pointed at a user, while a second camera 904 is pointed in the direction of the whiteboard 702. Displays 906 and 908 are adjacent to each camera 902 and 904 to allow users on each side of the conferencing system 900 to see the video conference. The angle 910 of the cameras 902 and 904 and displays 906 and 908 is adjusted by a hinge 912 that enables the conferencing system 900 to be set up in an "A" frame position with the displays facing outward.

The conferencing system 900 includes a video conferencing application that allows multiple users to interact across a network. In addition, the camera 904 facing away from the user can be used to monitor the white board 702 capturing and updating the image as required. When the white board image is updated, a high resolution image, exposed optimally for the white board is captured and sent with relatively low compression, and thus enabling the receiver to have a high quality, readable image of the white board 702. The second screen 908 and camera 904 may also be used to monitor a second user who also wishes to participate in the videoconference. Further, the person drawing on the white board 702 can also observe either the other end of the video call, or his work on the white board 702 described with respect to FIG. 10.

Figure 10:
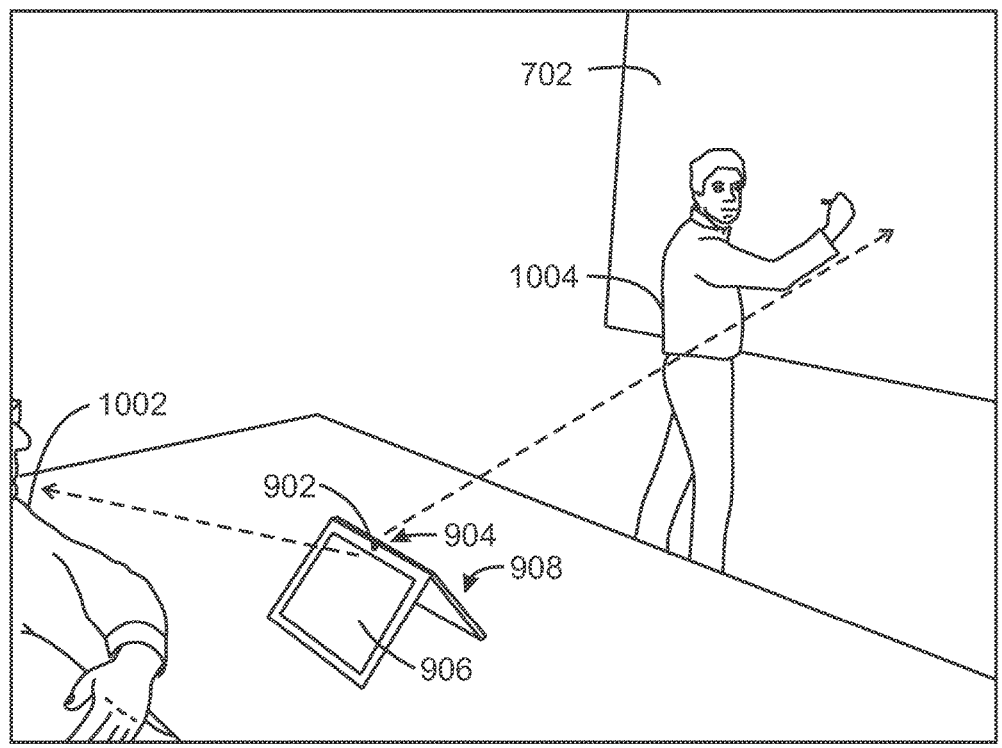
FIG. 10 is a drawing of a room that is setup for a video conference.

FIG. 10 is a drawing of a room 1000 that is setup for a video conference. Like numbers are as described with respect to FIGS. 7 and 9. A first user 1002 may be seated behind the conferencing system 900, in view of the rear camera 902, watching the conference on the display 906. The front camera 904 may face the second user 1004 and the white board 702. The conferencing system 900 may, for example, track the contents of the white board 702, e.g., editing out the user 1004 standing in front of the white board 702, and repairing any occlusions with previously imaged data. The cameras 902 and 904 may be of the same standard quality, or either, or both, may be a higher quality camera for better imaging. For example, either camera 902 or 904 may be a 640×480 camera, a 1920×1080 HD camera, or at any resolution in between. The resolution and type used for camera 902 or 904 may be selected on the basis of the storage, the usage, or the network bandwidth. Further, the resolution of the cameras may be an adjustable setpoint.

In some embodiments, a user 1002 or 1004 can selectively capture information from the white board 702 while remaining in the video conference. For example, if a user 1004 draws a complex or large picture on the white board 702 to clarify an issue, the user 1004 may send a high quality panoramic image of the white board 702 whenever he changes his drawing, limiting the distraction to others of the video conference. Large capture area, bad angles, un-even lighting, reflections, and poor contrast can be addressed using specialized capture and processing algorithms.

The number of cameras is not limited to two. The number and placement of the cameras may depend on the system design, including, for example, cost considerations, and desired user experience. For example, a user may not tolerate movement of the device. In this example, the system may be improved by selecting cameras with a wider field-of-view (FOV) or adding additional cameras, but at additional cost. The minimum camera resolution to get acceptable whiteboard information may also be dependent on system design, cost considerations, and user experience. For example, the system may recognize 1" letters at 2 meters. Languages and fonts may also be considered. In some cases, a long exposure may compensate for low light. The conferencing system 900 may also include intelligent stitching and stabilization.

Panoramic still images can be displayed on the majority of smart phones and are quite popular with users. A natural extension would be to have this capability when recording moving scenes using video. However, traditional panoramic technology does not support recording moving scenes using video. The alternative is wide FOV cameras that are expensive, large, and require significant post processing to correct the inherent lens distortion.

Figure 11:
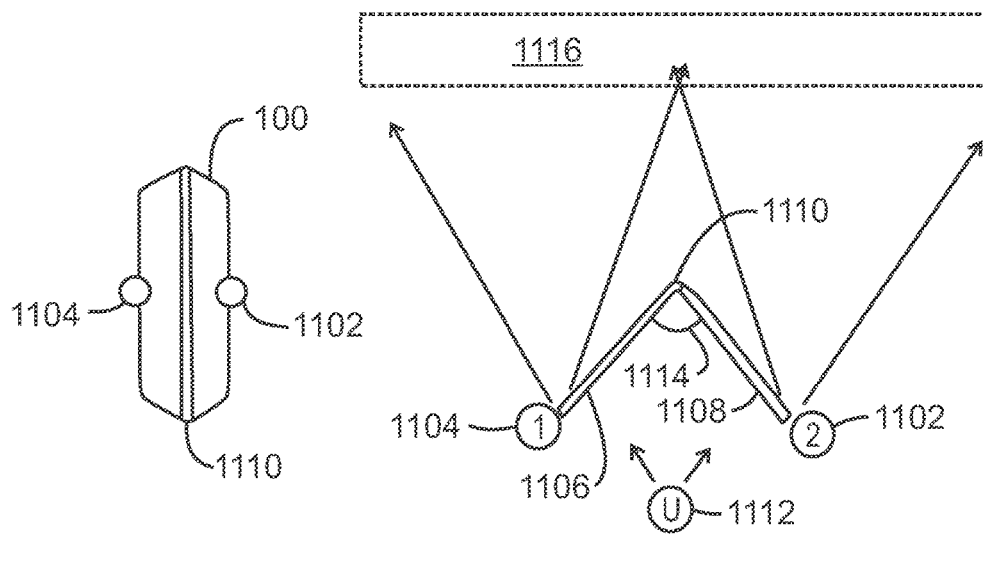
FIGS. 11A and 11B are drawings of a panoramic system that may accommodate a panoramic video application.

FIGS. 11A and 11B are drawings of a panoramic system 1100 that may accommodate a panoramic video application. FIG. 11A is a front view of the panoramic system 1100, while FIG. 11A is a top view of the system. The computer system 1100 may include two traditional cameras 1102 and 1104 of nominal FOV's mounted on the opposite side from each of two displays 1106 and 1108. The displays 1106 and 1108 are connected by a hinge 1110 with such that when a user 1112 looks at the two displays 1106 and 1108 side by side the cameras 1102 and 1104 point away from him. The hinge 1110 connecting the displays 1106 and 1108 is used to control the angle 1114 between the cameras 1102 and 1104 to optimize the partial overlap in FOV depending on the width of the scene being captured. A mechanism to lock the angle 1114 at the appropriate position can be included to enhance the convenience of the video shooting. The system then combines the images from the cameras 1102 and 1104 into a single video stream. Because the images are captured by separate cameras 1102 and 1104, real time video is possible.

Traditionally, to generate a panoramic image, a user would pan a camera across a scene 1116 being captured. In post processing, the overlapping areas of the scene would be matched allowing the non-overlapping areas to be joined to the original image. This would be repeated with additional captures until the desired scene is captured. Consequently, movement in the scene was not captured well, and thus, the technique was not applicable for video recording.

In contrast to the traditional panoramic image capture techniques, the panoramic system 1100 provides a more user-friendly system for generating a panorama from the scene 1116 that may include motion in the scene 1116. Further, the image from two wide FOV cameras may be combined to create enhanced or simple panorama stills. The user can stand the device in portrait mode to create stable platform and proper separation of cameras. In some cases, the user looks at the display 1106 and 1108 to ensure the correct angle and alignment on the subject. The user 1112 can look at two displays 1106 and 1108 that are at an angle. User alignment in bright sunlight may be addressed by the system display and hardware. Additionally, the FOV and optimal distance along with the number and placement of the cameras 1102 and 1104 may depend on the design of the device. In some cases, the cameras 1102 and 1104 may be adjustable, for example, allowing the angles relative to the displays 1106 and 1108.

In some cases, the panoramic system 1100 can be used in an augmented reality mode. For example, a user 1112 may interact with additional content, primarily indoors. A user 1112 may point the cameras 1102 and 1104 at an optical marker to get additional information and choices to his large screen. As a further example, the user 1112 can take a picture in a museum to access more information. The augmented reality can be used along with the present techniques described herein. The computing system 100 described in FIG. 1 can be used to implement other input or interaction techniques, such as the two handed input technique described with respect to FIGS. 12 and 13.

Figure 12:
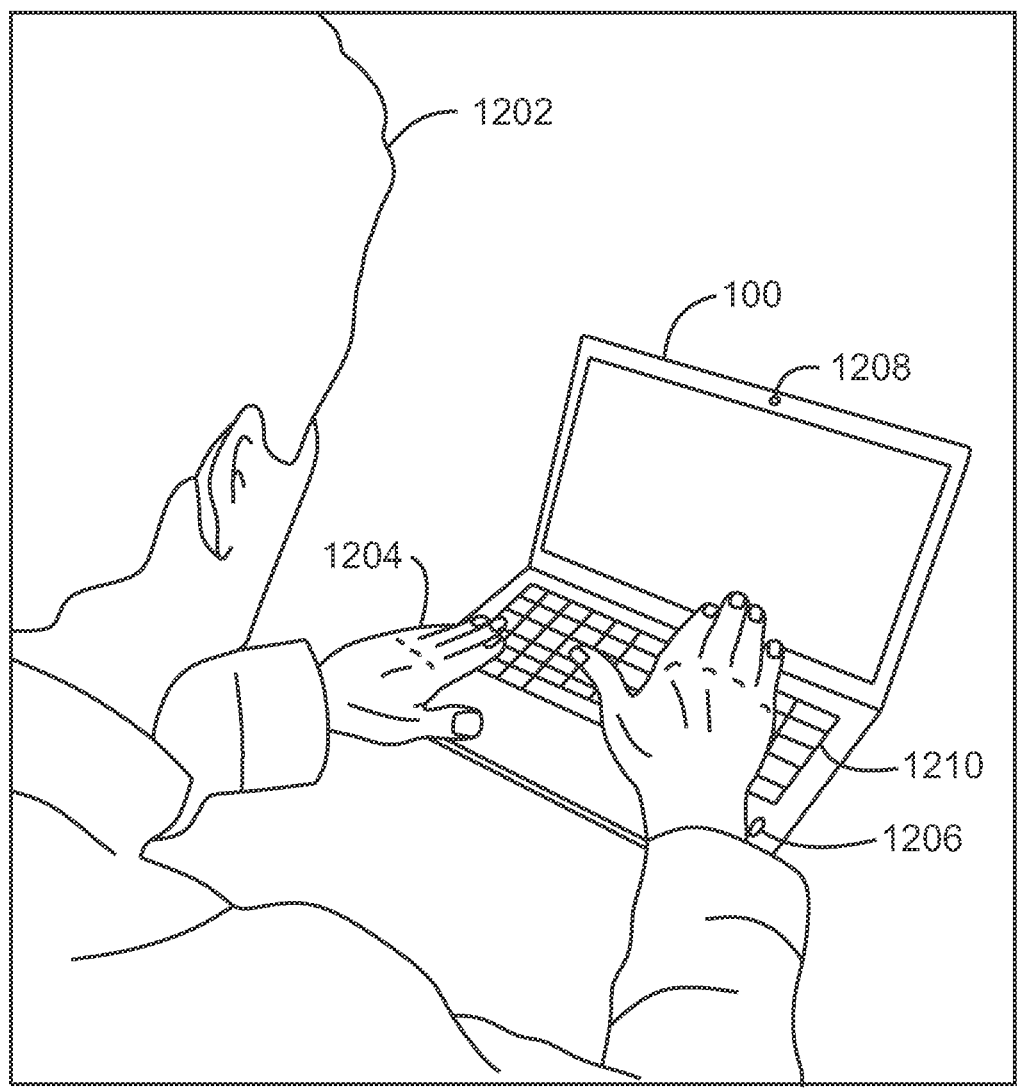
FIG. 12 is a schematic drawing of a user using cameras and to provide input to a gesture input system using hand gestures.

FIG. 12 is a schematic drawing of a user 1202 using cameras 1204 and 1206 to provide input to a gesture input system 1200 using hand gestures. The gesture input system 1200 may be based on the computing system 100 described with respect to FIG. 1. The user's left hand movement (X, Y, Z) is captured by the left camera 1204 and right hand movement (X, Y, Z) is captured by the right camera 1206. The hand gestures can be configured to operate games or to interact with other applications. Different types of inputs can be configured for different purposes, including right-handed gestures, left-handed gestures, or combined gestures. Other cameras, such as a videoconferencing camera 1208, may also be present.

In more traditional gesture input systems, the gestures are often non-ergonomic, up and down swipes, e.g., parallel to the display, which are detected using one or more motion cameras. Even techniques to capture hand gestures to augment the keyboard force the user to swipe up and down parallel to the display at an awkward angle. This quickly becomes tiring due to the unnatural movements.

In comparison, the gesture input system 1200 described herein includes a single computing device 100, such as a laptop, with two upwardly facing cameras 1204 and 1206 perpendicular to the keyboard 1210. The cameras 1204 and 1206 are separated in distance, e.g., by being placed on either side of the keyboard 1210, providing a comfortable and ergonomic hand spacing. Accordingly, the gesture cameras 1204 and 1206 may allow smooth, relaxed movements parallel to the keyboard 1210, while still allowing depth input when moving perpendicular to the keyboard 1210. Although the present techniques are described with two cameras 1204 and 1206, any number of image capture devices may be used to augment the keyboard 1210.

The gesture input system 1200 may be configured to handle ceiling and ambient lighting without losing track of the input gestures. Further, the gesture input system 1200 may also determine response time and can infer depth from image size. The placement or isolation of the cameras 1204 and 1206 around the keyboard 1210 can be fixed or adjustable. Further, the resolution and frame-rate of the cameras 1204 and 1206 can be fixed or adjusted.

Figure 13:
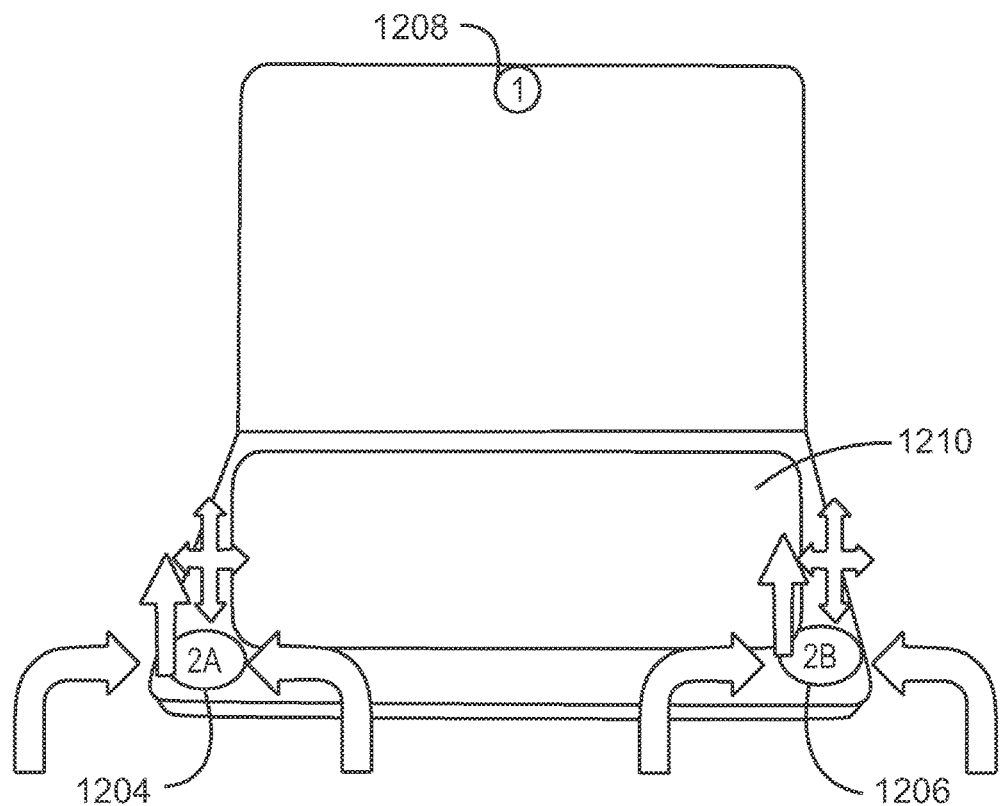
FIG. 13 is a schematic drawing of different motions that may be used to control the gesture input system.

FIG. 13 is a schematic drawing of different motions that may be used to control the gesture input system 1200. In some cases, the user may swipe over cameras 1204 and 1206 with either hand (or both hands). The gestures may correspond to commands in a game or application, such as "fire a gun" or "select new weapon." Also, a user's up/down motion may simulate virtual button, drums, or gross distance gestures. Right and left handed controls can be interdependent as in the example of motorcycle controls. Right and left handed controls can also be independent. For example, the right and left handed controls can function as two different virtual buttons.

Figure 14:
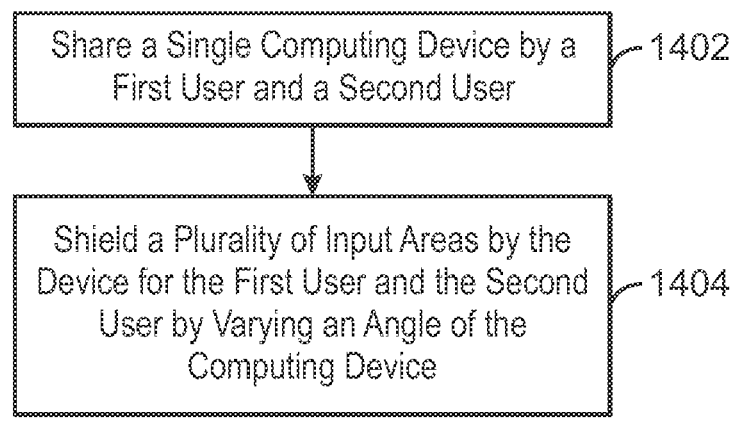
FIG. 14 is a block diagram of a method for implementing a gaming and collaboration mode.

FIG. 14 is a block diagram of a method 1400 for implementing a gaming and collaboration mode. The method 1400 begins at block 1402 with sharing a single computing device by a first user and a second user. At block 1404, a number of input areas are shielded by the device for the first user and the second user by varying an angle of the computing device.

Figure 15:
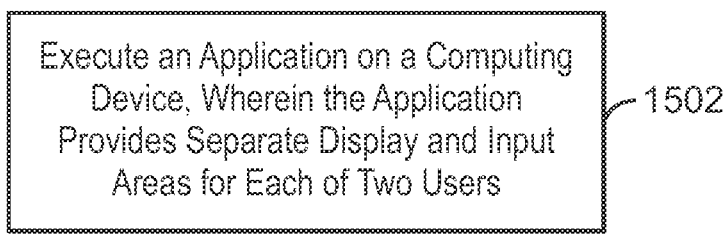
FIG. 15 is a block diagram of a method for executing an application on a computing device.

FIG. 15 is a block diagram of a method 1500 for executing an application on a computing device. The application is executed on a single platform at block 1502. The single platform includes a first display and a second display, wherein the first display corresponds to a first user and the second display corresponds to a second user, and the platform is positioned such that the first user cannot see the second display, and the second user cannot see the first display. The single platform also includes a plurality of image capture mechanisms and a mechanism to secure the device in an upside down tent mode.

Figure 16:
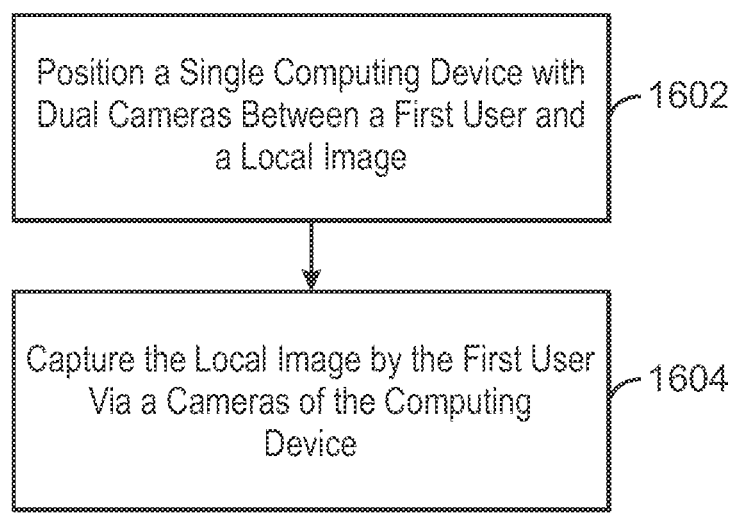
FIG. 16 is a block diagram of a method for video conferencing.

FIG. 16 is a block diagram of a method 1600 for video conferencing. The method 1600 begins at block 1602 by positioning a single computing device with dual displays between a first user and a local image. At block 1604 the local image is selectively captured by the first user via a plurality of cameras of the computing device.

Figure 17:
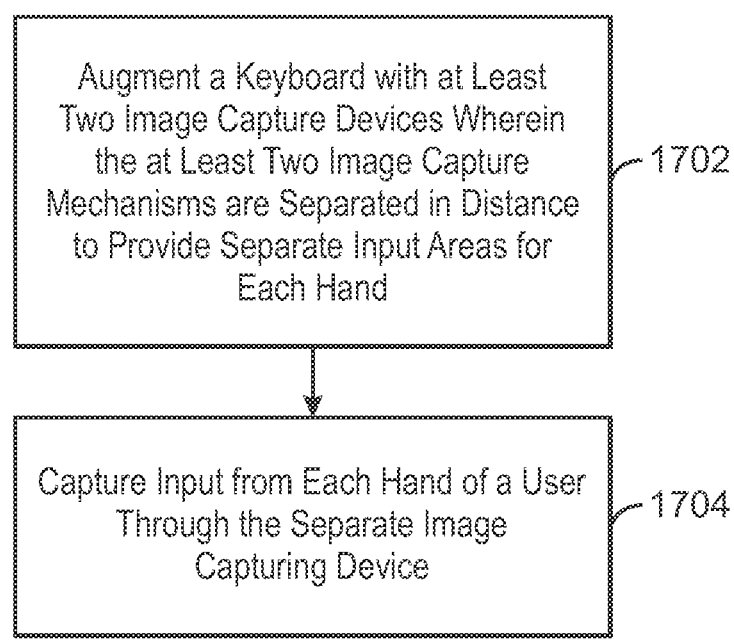
FIG. 17 is a block diagram of a method for obtaining input from hand motions.

FIG. 17 is a block diagram of a method 1700 for obtaining input from hand motions. The method 1700 begins at block 1702 with augmenting a keyboard with a plurality of image capture mechanisms. At block 1704, at least two image capture mechanisms are positioned to capture hand gestures of a user, wherein the image capture mechanisms are separated in distance to provide separate input areas for each hand.

Example 1

An apparatus is described herein. The apparatus includes a first display and a second display, wherein the first display and the second display are positioned such that a first user cannot see the display of a second user, and the second user cannot see the display of the first user. The apparatus also includes a plurality of image capture mechanisms, and a mechanism to secure the device in an upside down tent mode.

The apparatus may be a computing device. The plurality of image capture mechanisms may be used to capture hand gestures of a first user and a second user on a table. The hand gestures of the first user may be shielded from view of the second user by the apparatus. The hand gestures of the second user may be shielded from view of the first user by the apparatus. The apparatus may enable a private input area for input gestures.

The first display may correspond to a first user, and the second display may correspond to a second user. The first user may interact with the first display without knowledge of the second user. The second user may interact with the second display without knowledge of the first user. The apparatus may enable a gaming and collaboration mode without a local or network connection.

Example 2

A method for implementing a gaming and collaboration mode is described herein. The method includes sharing a single computing device by a first user and a second user, and shielding a plurality of input areas by the device for the first user and the second user by varying an angle of the computing device.

The angle of the computing device may be controlled by a hinge. The computing device may include a plurality of cameras, and the plurality of cameras may be placed such that the plurality of input areas is private. The computing device may be secured by a stand. The stand may be a mechanical holder. The gaming mode may include augmented reality.

The computing device may include a plurality of displays, and the first user may not be able to see the display of the second user, and the second user may not be able to see the display of the first user. The hand gestures of the first user may be shielded from view of the second user by the computing device. The hand gestures of the second user may be shielded from view of the first user by the computing device. The computing device may enable a private input area for input gestures.

Example 3

A system is described herein. The system includes an A-frame position, and a dual display, wherein the dual display includes at least two displays facing outward from the A-frame. The system also includes a plurality of cameras positioned adjacent to the at least two displays.

The plurality of cameras may enable the system to image a plurality of users corresponding to each of the at least two displays. A plurality of users may be able to interact using the system. A plurality of users may be able to interact competitively using the system. A plurality of users may be able to interact cooperatively using the system. The plurality of cameras may monitor the body and any gesture of a plurality of users. The plurality of users may be over two meters away from the system. A hinge may be used to maintain the A-frame position. The system may enable a dual display, two meter gaming experience. The system may include a mechanical holder.

Example 4

A method is described herein. The method includes executing an application on a computing device, wherein the application is executed on a single platform. The single platform includes a first display and a second display, wherein the first display corresponds to a first user and the second display corresponds to a second user, and the platform is positioned such that the first user cannot see the second display, and the second user cannot see the first display. The single platform also includes a plurality of image capture mechanisms, and a mechanism to secure the device in an upside down tent mode.

The application may a gaming application. The application may be a competitive gaming application. The application may be a collaborative gaming application. The computing device is a gaming and collaboration system that may be targeted to a plurality of users such that a gaming/collaboration experience is enabled by a single system. The application may include face to face action gaming. Two users may share the computing device wherein each may be at a distance of more than one meter away from the device. A hinge and display angle of the computing device may enable a separate augmented reality display for each user. The method may include a geometric distortion correction and a wide field of view. The application may provide bright and low-light sensitivity with HDR and ULL applications.

Example 5

An apparatus is described herein. The apparatus includes a first display and a second display, wherein the first display and the second display are outward facing. The apparatus also includes a plurality of image capture mechanisms, and a mechanism to secure the apparatus in an upside down tent mode during a video conference. The first display corresponds to a first user, and the apparatus is positioned such that a first image capture mechanism captures a local image and a second image capture mechanism and a second image capture mechanism captures the first user.

The local image may be a white board image. The local image may be modified during image capture. The local image may be modified by drawing or erasing the image. A second user may be able to modify the local image and observe the video conference using the second display. The first user or a second user may capture the local image without interruption to the video conference. The first user may selectively capture the local image while remaining productive during the video conference. The local image may a high contrast, high megapixel, panoramic still.

A number of image capture mechanisms of the plurality of capture mechanisms may include a long exposure. A large capture area, bad angle, uneven lighting, reflections, and poor contrast may be addressed using capture and processing algorithms.

Example 6

A method for video conferencing is described herein. The method includes positioning a single computing device with dual displays between a first user and a local image and selectively capturing the local image by the first user via a plurality of cameras of the computing device.

A second user may modify the local image and observe the video conference using a display of the computing device. A camera of the plurality of cameras may have a long exposure to compensate for low light. The computing device may be secured by a stand. The stand may be a mechanical holder. The computing device may include intelligent stitching. The computing device may include stabilization. A video use and a local image capture use during the video conference may use separate cameras. The computing device may include a video conference mode. The computing device may enable multiple users to participate in the video conference.

Example 7

An apparatus is described herein. The apparatus includes dual displays and a plurality of image capture mechanisms, wherein at least two image capture mechanisms are separated by a hinge. The apparatus also includes a mechanism to lock the apparatus in position to extend the field of view of the at least two image capture mechanisms, and a subsystem to combine data from the at least two image capture mechanisms into a single data stream.

The data stream may include an image. The data stream may include a video. The data stream may be a real time video stream. The hinge may be used to optimize the field of view for the at least two image capture mechanisms. The image capture mechanisms may be cameras. The image capture mechanisms may be sensors. The dual displays may be used to position the apparatus for image capture. The apparatus may include a plurality of displays. The apparatus may enable panoramic video recording and transfer.

Example 8

A method for obtaining input from hand motions is described herein. The method includes augmenting a keyboard with a plurality of image capture mechanisms, and positioning at least two image capture mechanism to capture hand gestures of a user. The at least two image capture mechanisms are separated in distance to provide separate input areas for each hand.

The at least two image capture mechanisms may be upward focused gesture cameras. The at least two image capture mechanisms may enable movements parallel to the keyboard with depth input perpendicular to the keyboard. A user's left hand movement may be captured by a left image capture mechanism, and a user's right hand movement may be captured by a right image capture mechanism. The image capture mechanisms may be adjustable. In the method, right handed controls and left handed controls may be dependent. In the method, right handed controls and left handed controls may be independent. A resolution and frame rate of the image capture device may be adjustable. Settings of the plurality of image capture devices may be adjustable. The settings may include an exposure time.

Example 9

An apparatus is described herein. The apparatus includes an integrated case with all parts disposed within, a processor, at least two displays, at least two cameras, and a storage system. The storage system includes code to direct the processor to obtain input from the at least two cameras, and provide display information to the at least two displays.

The storage system may include code to direct the processor to obtain control inputs from at least one of the at least two cameras. The storage system may include code to direct the processor to obtain control inputs from different users at each of the at least two cameras, and provide separate output for each of the different users at each of the at least two displays. Two cameras may be disposed along opposite sides of a keyboard on the apparatus, and the storage system may include code to direct the processor to obtain control inputs from different hands using each of the two cameras.

A locking hinge may be used to place the displays in a fixed configuration. The fixed configuration may form a triangle with a supporting surface, wherein a different display and a different camera points outward from each side of the apparatus. A mounting device may be used to support the apparatus in a V configuration, wherein a different display is visible from each side of the V.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
   a first display and a second display, wherein the first display and the second display are positioned such that a first user cannot see the second display of a second user, and the second user cannot see the first display of the first user;
   a plurality of image capture mechanisms;
   a mechanism configured to secure the first and second displays of the apparatus in an upside down tent configuration such that the apparatus is operable by the first and second user while in the upside down tent configuration; and
   a storage system comprising code that when executed directs a processor to obtain input from the plurality of image capture mechanisms, and provide display information comprising a geometric distortion correction and a wide field of view to the first display and the second display.

2. The apparatus of claim 1, wherein the apparatus is a computing device.

3. The apparatus of claim 1, wherein the plurality of image capture mechanisms is to capture hand gestures of the first user and the second user on a table.

4. The apparatus of claim 3, wherein the hand gestures of the first user are shielded from view of the second user by the apparatus.

5. The apparatus of claim 3, wherein the hand gestures of the second user are shielded from view of the first user by the apparatus.

6. The apparatus of claim 1, wherein the apparatus is to enable a private input area for input gestures.

7. The apparatus of claim 1, wherein the first display is to correspond to the first user, and the second display is to correspond to the second user.

8. The apparatus of claim 7, wherein the first user is to interact with the first display without knowledge of the second user.

9. The apparatus of claim 7, wherein the second user is to interact with the second display without knowledge of the first user.

10. The apparatus of claim 1, wherein the apparatus is to enable a gaming and collaboration mode without a local or network connection.

11. A system, comprising:
an apparatus capable of being operated in an A-frame configuration;
a dual display of the apparatus, wherein the dual display includes at least two displays facing outward from the A-frame configuration, wherein a first display corresponds to a first user and a second display corresponds to a second user, and the apparatus is positioned such that the first user cannot see the second display, and the second user cannot see the first display;
a plurality of cameras positioned adjacent to the at least two displays;
a mechanism configured to secure the apparatus in an upside down tent configuration such that the apparatus is operable by the first and second user while in the upside down tent configuration; and
a storage system comprising code that when executed directs a processor to obtain input from the plurality of cameras, and provide display information comprising a geometric distortion correction and a wide field of view to the at least two displays.

12. The system of claim 11, wherein the plurality of cameras enables the system to image a plurality of users corresponding to each of the at least two displays.

13. The system of claim 11, wherein the plurality of users can interact using the system.

14. The system of claim 11, wherein the plurality of users can interact competitively using the system.

15. The system of claim 11, wherein the plurality of users can interact cooperatively using the system.

16. The system of claim 11, wherein the plurality of cameras are to monitor the body and any gesture of the plurality of users.

17. The system of claim 11, wherein the plurality of users is over two meters away from the system.

18. The system of claim 11, comprising a hinge that is to maintain the A-frame position.

19. The system of claim 11, wherein the system is to enable a dual display, two meter gaming experience.

20. The system of claim 11, comprising a mechanical holder.

21. A method, comprising
executing an application on a computing device by a processor, wherein the application is executed on a single platform, wherein the single platform comprises:
a first display and a second display, wherein the first display corresponds to a first user and the second display corresponds to a second user, and the platform is positioned such that the first user cannot see the second display, and the second user cannot see the first display;
a plurality of image capture mechanisms;
a mechanism configured to secure the first and second display in an upside down tent configuration such that the device is operable by the first and second user while in the upside down tent configuration;
a storage system comprising code that when executed directs the processor to obtain input from the plurality of image capture mechanisms, and provide display information to the first display and the second display; and
a geometric distortion correction and a wide field of view.

22. The method of claim 21, wherein the application is a gaming application.

23. The method of claim 21, wherein the application is a competitive gaming application.

24. The method of claim 21, wherein the application is a collaborative gaming application.

25. The method of claim 21, wherein the computing device is a gaming and collaboration system targeted to a plurality of users such that a gaming or collaboration experience is enabled by a single system.

26. The method of claim 21, comprising face-face action gaming.

27. The method of claim 21, wherein two users share the computing device at a distance of more than one meter away from the device.

28. The method of claim 21, wherein a hinge and display angle of the computing device enables a separate augmented reality display for each user.

29. The method of claim 21, wherein bright and low-light sensitivity are addressed with HDR and ULL applications.

30. An apparatus, comprising:
a first display and a second display, wherein the first display and the second display are outward facing;
a plurality of image capture mechanisms;
a mechanism configured to secure the apparatus in an upside down tent configuration such that the apparatus is operable in this configuration by a first user during a video conference, wherein the first display corresponds to the first user, and the apparatus is positioned such that a first image capture mechanism captures a local image and a second image capture mechanism captures the first user; and
a storage system comprising code that when executed directs a processor to obtain input from the plurality of image capture mechanisms, and provide display information comprising a geometric distortion correction and a wide field of view to the first display and the second display.

31. The apparatus of claim 30, wherein the local image is a white board image.

32. The apparatus of claim 30, wherein the local image is modified during image capture.

33. The apparatus of claim 30, wherein the local image is modified by drawing or erasing the image.

34. The apparatus of claim 30, wherein a second user can modify the local image and observe the video conference using the second display.

35. The apparatus of claim 30, wherein the first user or a second user can capture the local image without interruption to the video conference.

36. The apparatus of claim 30, wherein the first user selectively captures the local image while remaining productive during the video conference.

37. The apparatus of claim 30, wherein the local image is a high contrast, high megapixel, panoramic still.

38. The apparatus of claim 30, wherein a number of image capture mechanisms of the plurality of image capture mechanisms include a long exposure to compensate for low light.

39. The apparatus of claim 30, wherein a large capture area, bad angle, and poor contrast are addressed using capture and processing algorithms.

40. A method for video conferencing, comprising:
positioning a single computing device with dual displays between a first user and a local image and securing the single computing device in an upside down tent mode, wherein a first display corresponds to the first user;
selectively capturing the local image by the first user via a plurality of cameras of the computing device, wherein the single computing device is positioned such that a first camera of the plurality of cameras captures the local image and a second camera of the plurality of cameras captures the first user; and using code to direct a processor to obtain input from the plurality of cameras, and to provide display information comprising a geometric distortion correction and a wide field of view to the dual displays.

41. The method of claim 40, wherein a second user is to modify the local image and observe the video conference using a display of the computing device.

42. The method of claim 40, wherein a camera of the plurality of cameras has a long exposure to compensate for low light.

43. The method of claim 40, wherein the computing device is secured by a stand.

44. The method of claim 43, wherein the stand is a mechanical holder.

45. The method of claim 40, wherein the computing device includes intelligent stitching.

46. The method of claim 40, wherein the computing device includes stabilization.

47. The method of claim 40, wherein the computing device includes a video conference mode.

48. The method of claim 40, wherein the computing device enables multiple users to participate in the video conference.

49. An apparatus, comprising:
an integrated case with all parts disposed within;
a processor;
at least two displays, wherein the first display corresponds to a first user and the second display corresponds to a second user, and wherein the apparatus is configured such that the first user cannot see the second display, and the second user cannot see the first display;
at least two cameras;
a mechanism configured to secure the device in an upside down tent configuration such that the device is operable by the first and second user while in the upside down tent configuration; and
a storage system comprising code that when executed directs the processor to obtain input from the at least two cameras, and provide display information comprising a geometric distortion correction and a wide field of view to the at least two displays.

50. The apparatus of claim 49, wherein the storage system comprises code to direct the processor to obtain control inputs from at least one of the at least two cameras.

51. The apparatus of claim 49, wherein the storage system comprises code to direct the processor to obtain control inputs from different users at each of the at least two cameras, and provide separate output for each of the different users at each of the at least two displays.

52. The apparatus of claim 49, wherein two cameras are disposed along opposite sides of a keyboard on the apparatus, and the storage system comprises code to direct the processor to obtain control inputs from different hands using each of the two cameras.

53. The apparatus of claim 49, comprising a locking hinge to place the displays in a fixed configuration.

54. The apparatus of claim 53, wherein the fixed configuration forms a triangle with a supporting surface, wherein a different display and a different camera point outward from each side of the apparatus.

55. The apparatus of claim 53, comprising a-mounting device to support the apparatus in a V configuration, wherein a different display is visible from each side of the V.

* * * * *